March 2, 1954

R. W. FAULHABER 2,670,784

CYCLE SADDLE WITH BUMPER BAR

Filed Nov. 3, 1949

INVENTOR.
ROLAND W. FAULHABER.
BY
*Richey & Watts*
ATTORNEYS.

Patented Mar. 2, 1954

2,670,784

UNITED STATES PATENT OFFICE 2,670,784

CYCLE SADDLE WITH BUMPER BAR

Roland W. Faulhaber, Monroeville, Ohio, assignor to The Faulhaber Company, Monroeville, Ohio, a corporation of Ohio Application November 3, 1949, Serial No. 125,250

3 Claims. (Cl. 155—5.11)

This invention relates to cycles, particularly bicycles, and to saddles such as are commonly used on bicycles, motorcycles, and tricycles. The invention is directed to the provision of a member which I have termed a "bumper bar" on the cycle saddle. The bumper bar is formed to lie around the rear part of the saddle and to be readily mounted on the saddle. The bumper bar is useful to prevent scuffing or other damage of the seat if the cycle should fall and is also useful to provide a convenient and safe hand rail which may be grasped by a passenger riding on a rear seat or carrier of the cycle.

The principal objects of the invention are to provide greater safety for cycle passengers and protection for the saddle of the cycle, to provide a cycle saddle with a bumper bar to protect the saddle, to provide a hand rail on a cycle saddle.

A further object of the invention is to provide a bumper bar which may be easily attached to conventional saddles. A subsidiary object of the invention is to provide a guard for a cycle saddle which is attractive and ornamental in appearance.

The manner in which the objects of the invention are realized and the advantages thereof will be apparent to those skilled in the art from the description herein of the preferred embodiment of the invention.

Figure 1:
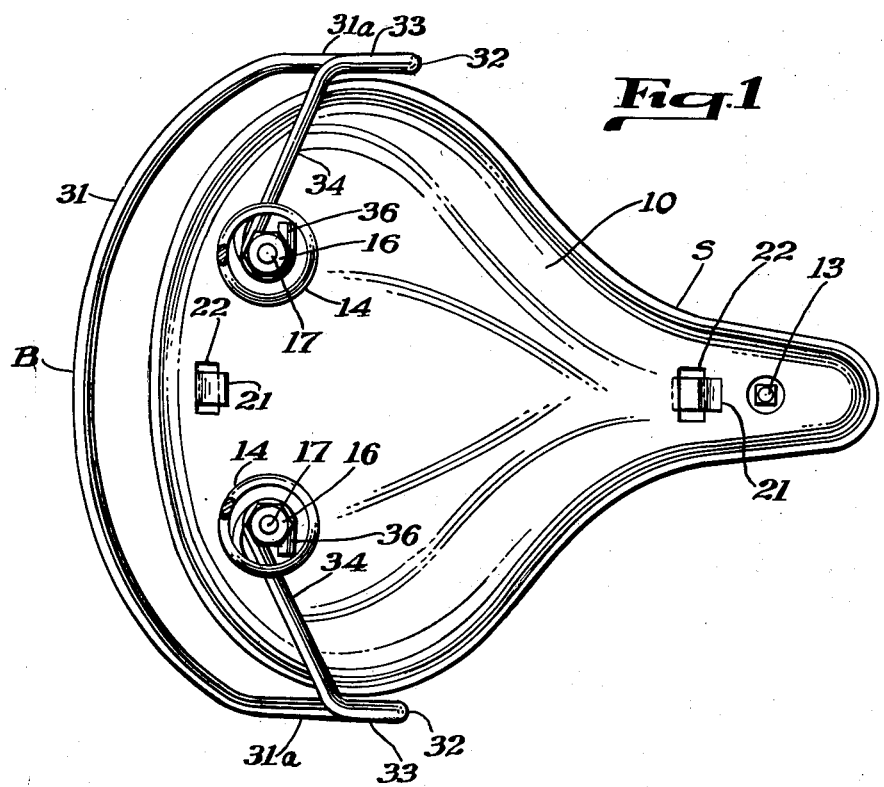
Figure 2:
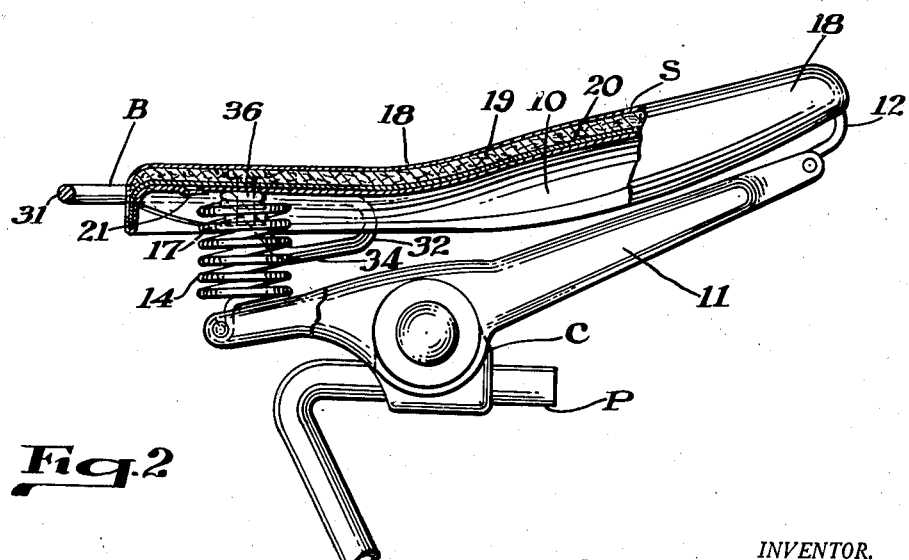

Referring to the drawings, Fig. 1 is a view from below of the seat portion of a saddle with the bumper bar in place; and Fig. 2 is a side elevation, partly in section, of a saddle with the bumper bar.

The saddle, which is described as illustrative of typical construction of saddles, comprises a seat S, the principal structural member of which is a formed sheet metal plate 10, of the usual outline of cycle saddles, and formed with a depending flange. The plate 10 is supported by a reach member comprising two parallel members 11 which are adjustably mounted on the seat post P by means of a clamping device C. The front end of the reach member is coupled to the front end of the seat by a C-spring 12 fixed to the seat by means of a bolt 13 extending through the plate 10. The rear end of the seat is supported by two coil springs 14, the upper ends of which are formed with loops held under nuts 16 on bolts or studs 17 depending from the plate 10. The lower end of each spring is connected to the rear end of the reach member. The seat plate 10 is covered by a pad or cushion comprising a cover 18 of leather or fabric, a felt pad 19 and a light metal plate 20. The bolts or studs 13 and 17 are provided with heads which are disposed above the plate 20 and may be provided with square shanks, be welded to the plate 20, or be otherwise held against rotation. The bolts extend through clearance holes in the frame plate 10. The plate 20 may be held on the plate 10 by tabs 21 extending through holes 22 in the plate 10 and bent over, these tabs serving to hold the parts of the seat together before the seat is assembled on the springs.

The seat construction described above is merely an example of a usual type of seat construction in which the seat is provided with bolts or studs depending from the rear portion thereof by which the seat is fixed to the springs or other structure by which it is supported on the cycle. So far as the present invention is concerned, the details of construction of the seat are otherwise immaterial.

The bumper bar B of the invention is preferably of the general form and proportions illustrated and is preferably bent from light rod, preferably round stock about ¼ inch in diameter. Steel rod of this size is of sufficient strength for the purpose and is sufficiently resilient to yield slightly to blows which may be caused, for example, by overturning of the cycle, without damage to the bar.

As will be apparent, the bumper bar comprises an arcuate portion 31, roughly semi-elliptical in form, which is disposed around the rear end of the seat terminating in a straight section 31a so that the forward ends of the section 31a are in the vicinity of the widest part of the seat. At the forward end of the section 31a the bar is doubled back as indicated at 32, continuing with a short rearwardly directed portion 33 underlying and generally parallel to the forward part of the straight section. Beyond the portions 33 the bar is bent inwardly to provide supporting portions 34 extending under the seat to the studs 17. The ends of the bar are bent to form loops 36 which may be slipped over the studs 17. As is more clearly apparent in Fig. 2, the portion of each support member adjacent the loops 36 is directed upwardly so that the support is disposed below the edge of the seat. The bar is mounted on the saddle by slipping the loops 36 over the studs 17, after which the studs are passed through the loops of the springs 14 and the nuts 16 are tightened. The bar is thus mounted firmly on the saddle without the necessity of any special supporting structure and may be readily added to existing saddles. It will be understood, of course, that the exact size and form of the bumper may be varied for saddles of different size and with different locations of the studs 17. The section 31a and the portions 32, 33 and 34 comprise a spring portion which provides added resilience.

The forward portion of the bumper bar extends alongside the saddle seat and slightly spaced therefrom, and the arcuate portion is spaced farther from the saddle to provide room for the fingers so that it may be conveniently grasped. The arcuate portion is preferably disposed slightly below the top of the seat and approximately in a plane parallel to the plane of the rear portion of the seat. The forward portion provides a resilient guard for the side of the saddle if the cycle falls over.

The bar is preferably chrome-plated for durability and attractive appearance.

It will be apparent to those skilled in the art that variations of the invention are permissible within the scope thereof, which is not to be regarded as limited by the description herein of the preferred embodiment of the invention.

I claim:

1. A bumper bar adapted for mounting on a cycle seat provided with studs depending from the rear portion thereof for attachment of the seat to a supporting member, the bumper bar being formed of resilient material and comprising a central arcuate portion, a spring portion integral with the arcuate portion at each end thereof, said spring portion comprising a straight section, a doubled back portion under the straight section and inwardly, and loops on the free ends of the support portions spaced for mounting on the studs of the seat, all so proportioned that the arcuate portion is disposed around and spaced from the rear portion of the seat and the spring portions are clear of the seat to provide a resilient support for the arcuate portion when the bumper bar is mounted on the studs.

2. A bumper bar adapted for mounting on a cycle seat provided with studs depending from the rear portion thereof for attachment of the seat to a supporting member, the bumper bar being formed of resilient material and comprising a central arcuate portion, a spring portion integral with the arcuate portion at each end thereof, said spring section comprising a straight portion, a doubled back portion substantially parallel to the adjacent part of the straight section and further bent inwardly to approach the other spring portion and loops on the free ends of the spring portions spaced for mounting on the studs of the seat, all so proportioned that the arcuate portion is disposed around and spaced from the rear portion of the seat and the spring portions are clear of the seat to provide a resilient support for the arcuate portion when the bumper bar is mounted on the studs.

3. A bumper bar adapted for mounting on a cycle seat formed of a rod of resilient material and comprising a central arcuate portion lying substantially in a horizontal plane, a spring portion integral with each end of said central portion comprising a portion of said rod bent downwardly out of the plane of said central portion and rearwardly through substantially 180°, and a support portion extending inwardly from each of said spring portions and formed for attachment to the cycle seat whereby said central portion is resiliently supported through said spring portions for yielding both in vertical and lateral directions.

ROLAND W. FAULHABER.

References Cited in the file of this patent

UNITED STATES PATENTS

| Number | Name | Date |
|---|---|---|
| 2,320,210 | Bender | May 25, 1943 |
| 2,433,686 | Du Pont | Dec. 30, 1947 |
| 2,467,632 | Persons | Apr. 19, 1949 |
| 2,519,027 | Disney | Aug. 15, 1950 |

FOREIGN PATENTS

| Number | Country | Date |
|---|---|---|
| 373,211 | Italy | July 21, 1939 |